US006196957B1

(12) United States Patent
Hiraguri et al.

(10) Patent No.: US 6,196,957 B1
(45) Date of Patent: Mar. 6, 2001

(54) INSULATING ROLL (75) Inventors: Kanji Hiraguri; Tomoaki Yokomizo, both of Yamanashi-ken (JP)

(73) Assignee: Ask Technica Corporation, Yamanashi (JP)

( * ) Notice: Subject to any disclaimer, the term of this patent is extended or adjusted under 35 U.S.C. 154(b) by 0 days.

(21) Appl. No.: 09/112,969

(22) Filed: Jul. 9, 1998

(30) Foreign Application Priority Data

Jul. 10, 1997 (JP) .................................................. 9-185495

(51) Int. Cl.[7] ...................................................... B23P 15/00
(52) U.S. Cl. .................................................. 492/46; 492/54
(58) Field of Search ................................ 492/40, 46, 54

(56) References Cited

U.S. PATENT DOCUMENTS

| 1,853,879 | 4/1932 | Paxton et al. | |
| 2,650,034 | * 8/1953 | Wiemer | 492/46 |
| 3,710,469 | * 1/1973 | Kitazawa | 492/40 |
| 4,352,230 | * 10/1982 | Sukenik | 492/40 |
| 5,097,596 | * 3/1992 | Hoogesteger et al. | 492/40 |
| 5,759,141 | * 6/1998 | Schmitz | 492/40 |

FOREIGN PATENT DOCUMENTS

| 506672 | 9/1930 | (DE) . |
| 1 408 936 | 10/1968 | (DE) . |
| 44 30 335 A1 | 2/1996 | (DE) . |
| 0 091 292 A1 | 10/1983 | (EP) . |
| 0 473 926 A2 | 3/1992 | (EP) . |
| 2 067 728 | 7/1981 | (GB) . |

OTHER PUBLICATIONS

XP–002078160, Abstract of JP 0206 1493, dated Mar. 1, 1990, appearing in Database WPI, Week 9015, Derwent AN 90–111415, XP–002078160.

* cited by examiner

*Primary Examiner*—Irene Cuda
(74) *Attorney, Agent, or Firm*—Morgan & Finnegan, L.L.P.

(57) ABSTRACT

An insulating roll is provided which is constructed with a roll body formed of a plurality of inorganic material-derived discs laminated with each other and positioned axially of and around a metal conduit, and a heat-resistant metal tube disposed integrally over an outer periphery of the roll body. A tubular cover formed by spray coating a ceramic material on the heat-resistant metal tube, or a sleeve made of sintered ceramic material may be disposed, where desired, in place of the heat-resistant metal tube. This roll has low thermal conductivity and high impact strength without involving feduction of the surface temperature of a material being heat treated in a furnace, or reduced ambient temperature in the furnace during heat treatment.

10 Claims, 6 Drawing Sheets

INSULATING ROLL

BACKGROUND OF THE INVENTION

1. Technical Field of the Invention

This invention relates to insulating rolls and has particular reference to an improved type of insulating roll which has low thermal conductivity and high impact strength without involving reduced surface temperature of materials being heat treated in a furnace (of materials being rolled), or reduced ambient temperature in the furnace during heat treatment.

2. Description of the Related Art

Certain rolls are generally known as insulating rolls, and they include a transport roll used in a process step of heat treatment wherein stainless steel tubes are welded with each other, a sealing roll used in a preheating step of steel in a reducing furnace so as to shield the ambient furnace gas at the inlet and outlet of the furnace, and a transport roll used in transporting a material to be treated in a furnace.

Figure 1:
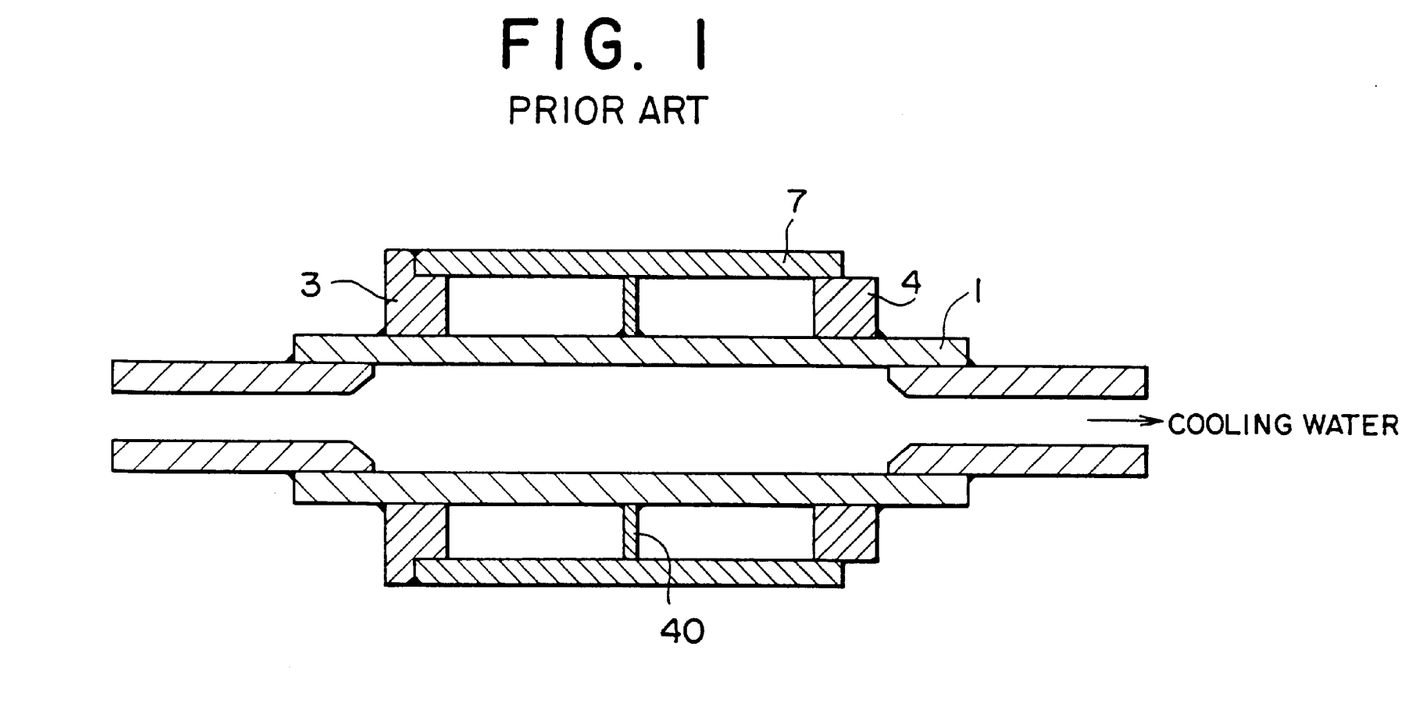
FIG. 1 is a cross-sectional view of an insulating roll according to the prior art.
Figure 2:
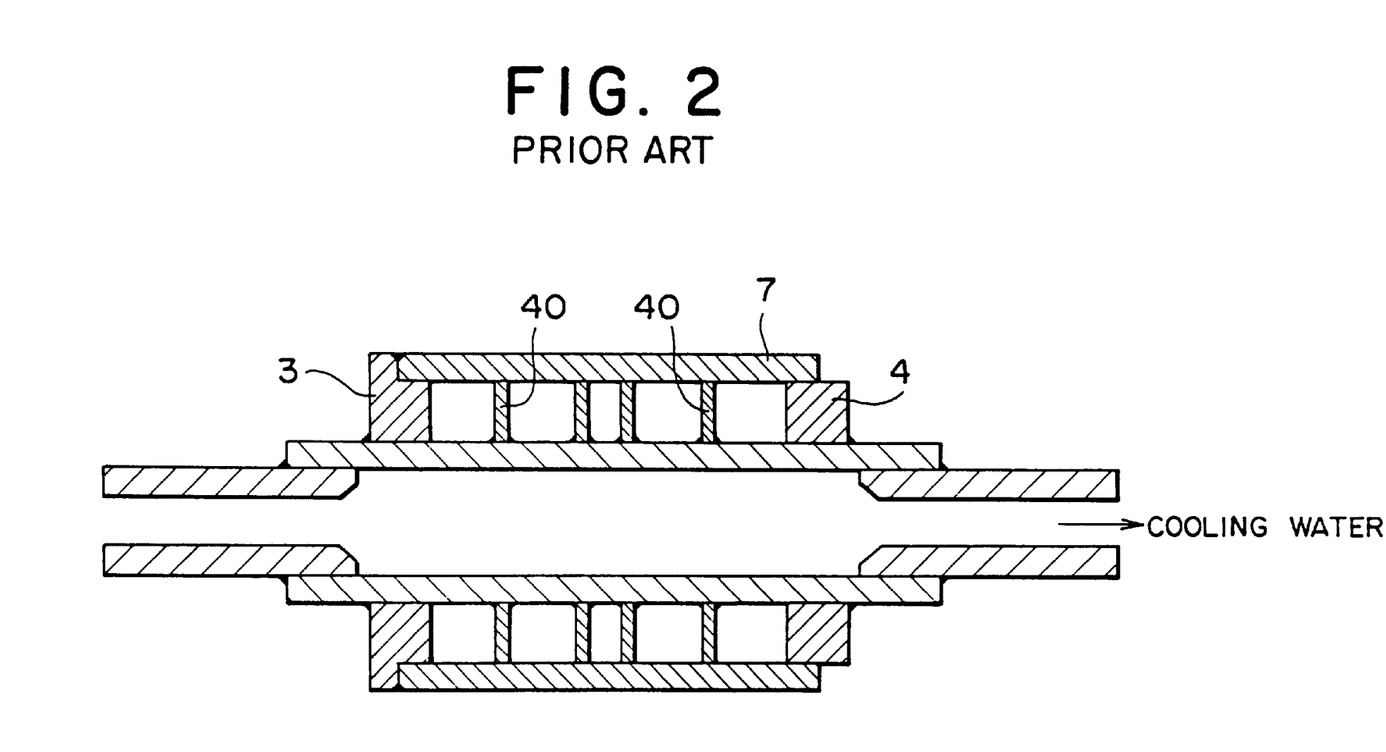
FIG. 2 is similar to FIG. 1, but is a modification of the roll shown in FIG. 1.
Figure 3:
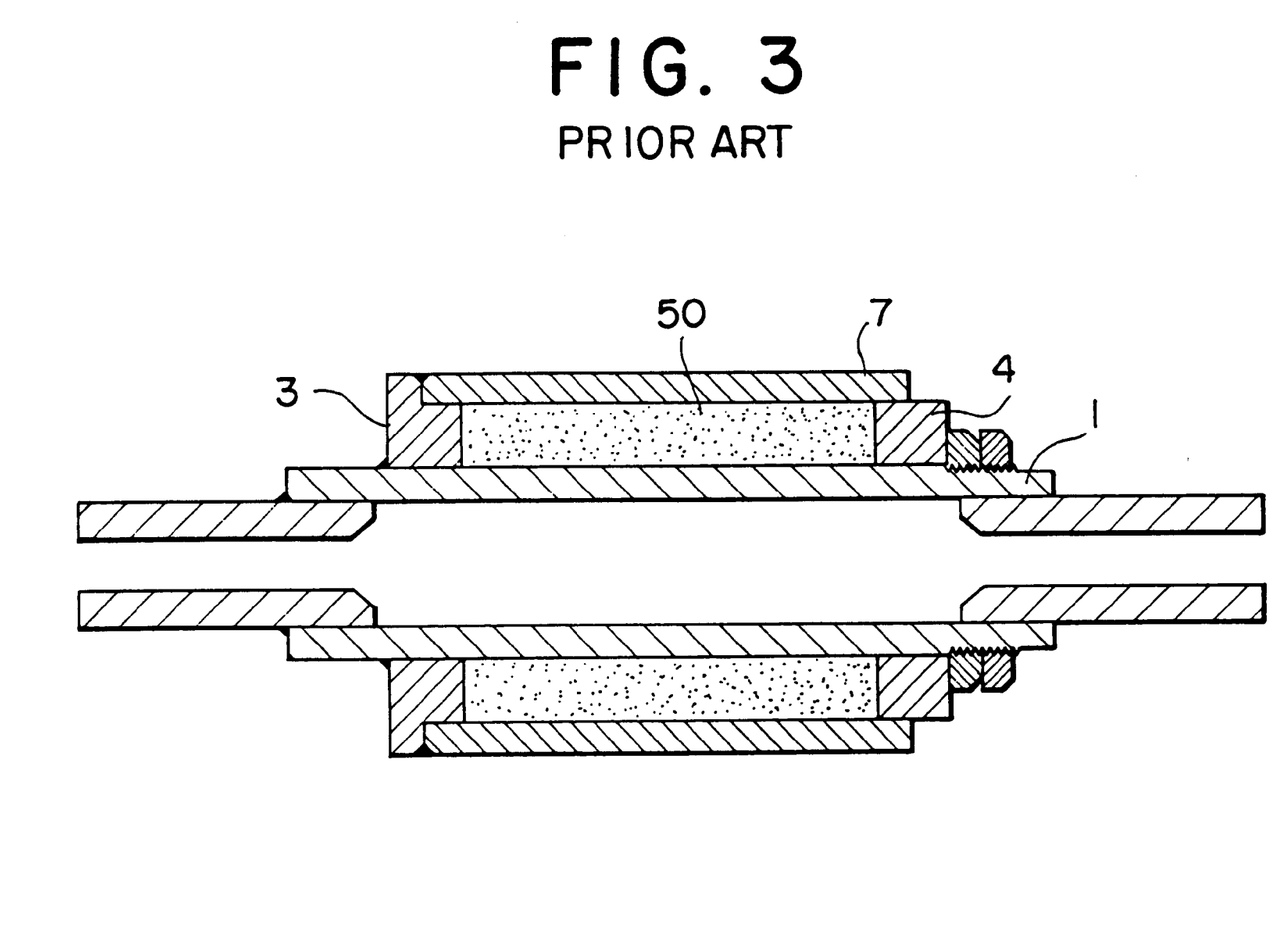
FIG. 3 is a cross-sectional view of another form of the prior art roll.

Those known insulating rolls have been so structured as to follow either one of two sorts of conventional practice disclosed in Japanese Unexamined Patent Publication No. 9-125157. First such practice is directed, as shown in FIGS. 1 and 2 of the accompanying drawings, to a roll constructed with a metal conduit 1 and an outer tube 7 made of thermally resistant metal. The outer tube 7 is firmly attached to the metal conduit 1 by flanges 3, 4 located at opposite ends of the outer tube 7 and by one or more metallic support rings 40 fixed peripherally between the flanges 3, 4. To provide water cooling, the metal conduit 1 allows passage of cooling water therethrough. The last practice is seen in FIG. 3 wherein a thermal insulating material 50, as of a fibrous ceramic is filled in a space defined between the metal conduit 1 and the outer tube 7 of thermally resistant metal. However, the conventional insulating rolls noted here have experienced the problems set forth below.

Firstly, the first practice of the prior publication cited above produces an insulating roll having all of its constituent members made of metal. This means that the roll invites too high a thermal conductivity and hence cools the outer tube as well, reducing the temperature of the material being treated and the ambient temperature in the furnace. The temperature drop is found particularly sharp at a region in proximity to the support flange fixed peripherally of the metal conduit in attaining firm attachment of the outer tube.

To make a spacious flange-to-flange arrangement for avoiding the temperature drop, the outer tube is required to have a large thickness. Furthermore, the roll produced by the first practice is problematic in its working atmosphere as it is extremely noisy due to shock caused upon contact of the roll with a material to be transported.

Next, the last practice leads to an insulating roll in which a pad of thermal insulating fiber or mortar has been packed in a space defined between the metal conduit and the outer tube. This pad is used to gain improved thermal insulation of the roll and stabilized support of the outer tube with respect to the metal conduit, or to otherwise obviate the drawbacks encountered in the first practice. However, the insulating fiber or insulating mortar becomes deteriorated and powdery upon exposure to repeated rise and fall of the furnace temperature. The result is the failure to adequately support the outer tube, which brings about a deformed or warped roll. Additionally, it is difficult to pack a bulky fibrous pad uniformly during production of the roll, and this is responsible for irregular packing density with consequent warping of the roll. Though easy to pack, mortar is apt to get dry and hence shrink over an extended period of time after packing, thereby creating gaps in the pad.

SUMMARY OF THE INVENTION

Accordingly, the present invention for its object provides an insulating roll which is capable of affording low thermal conductivity and high impact strength and of avoiding reduction of the surface temperature of the materials being heat treated in a furnace (of materials being rolled), or of reducing the ambient temperature in the furnace during heat treatment.

The provision of this insulating roll can overcome the foregoing problems of the prior art.

According to one important aspect of the present invention, an insulating roll is provided which comprises: a roll body comprising a metal conduit arranged to pass cooling water therethrough, and a plurality of discs each derived from an inorganic material and laminated with each other and positioned axially on and around the metal conduit; and a metal tube formed of a heat-resistant metal and disposed integrally over the outer periphery of the roll body.

Preferably, such roll further includes a tubular cover formed by spray coating of a ceramic material over the metal tube.

Another aspect of the invention provides an insulating roll which comprises: a roll body comprising a metal conduit arranged to pass cooling water therethrough, and a plurality of discs each formed of an inorganic material and laminated with each other and positioned axially on and around the metal conduit; and a sleeve formed of sintered ceramic material and disposed integrally over the outer periphery of the roll body.

The above and other objects, features and advantages of the present invention will be readily apparent to those versed in the art from the following detailed description taken in conjuction with the accompanying drawings.

ILLUSTRATIVE EMBODIMENTS OF THE INVENTION

Figure 4:
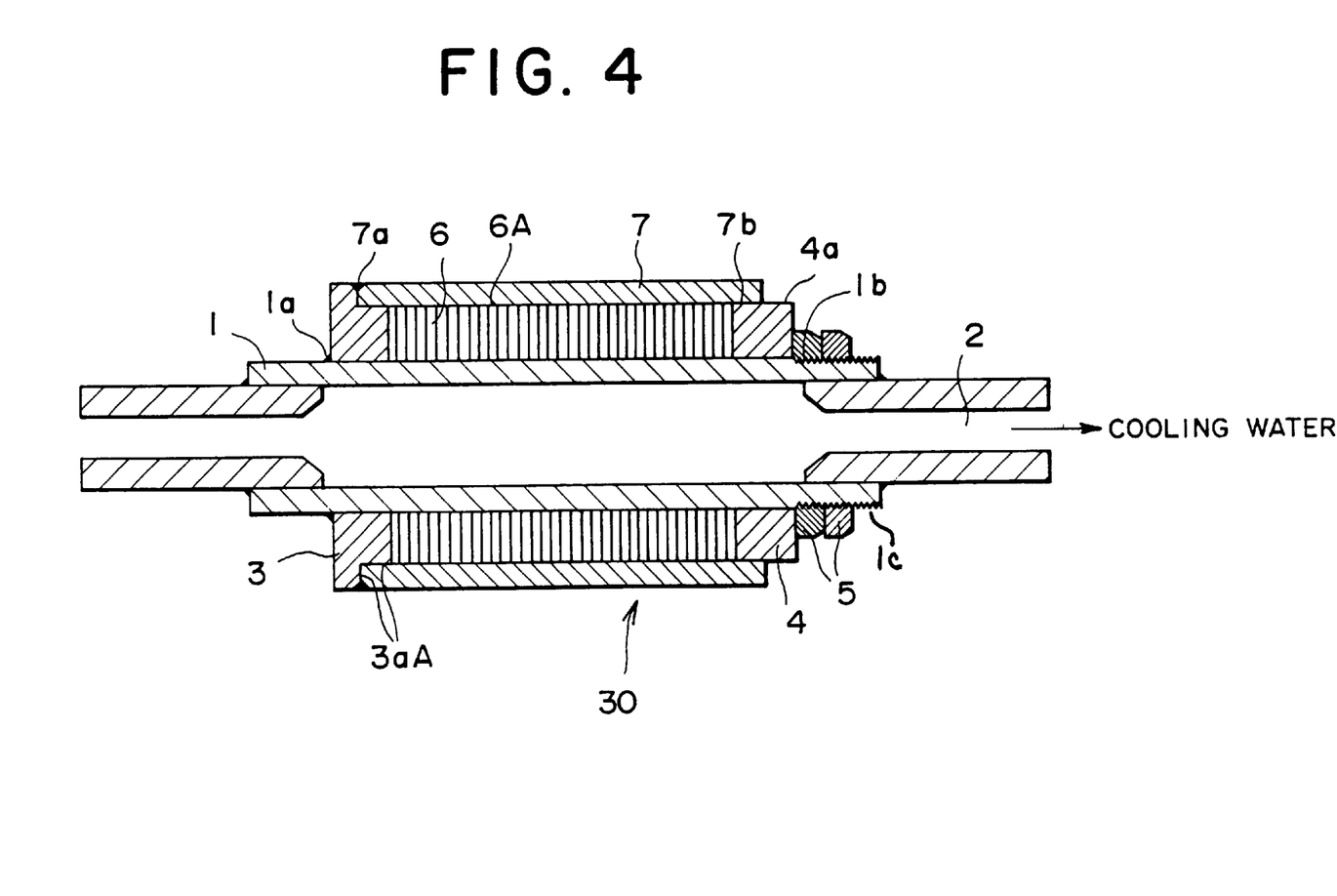
FIG. 4 is a cross-sectional view of one form of the insulating roll according to the present invention.

Referring now to the drawings and to FIG. 4 in particular, a metal conduit designated at 1 is arranged to flow cooling water therethrough and is provided with guide paths 2. A fixed flange 3 is secured by welding to one end 1a of the conduit 1 on its outer periphery, and a movable flange 4 is located at the opposite end 1b of the conduit 1. The flange 4 is so structured as to be urged against nuts 5 interengaged with a screw or theraded portion 1c of the conduit.

A plurality of ring-shaped inorganic material-derived discs 6 are in laminated arrangement with each other and positioned axially on the roll and in a space defined between the metal conduit 1 and the fixed and movable flanges 3, 4. In this embodiment, the inorganic material-derived discs 6 are formed of a non-asbestos material which is commercially available under the tradenamed ASK #2055 from the assignee of the invention presented here. The non-asbestos material, however, should not be construed as limiting the invention because other suitable inorganic materials may be employed where desired. When inwardly rotated, the nuts 5 are pressed toward the fixed flange 3 so that the discs 6 are brought into firmly pressed relation to each other. Lamination of the discs 6 on the conduit 1 leads to formation of a roll body 6A.

A metal tube 7 made of a heat-resistant metal for example SUS 310S, is fitted to cover the roll body 6A between the fixed flange 3 and the movable flange 4. The metal tube 7 is mounted at its one end 7a on a stepped portion 3aA provided in the fixed flange 3 and at the opposite end 7b on an outer periphery 4a defined on the movable flange 4. The end 7a of the metal tube 7 is securely attached as by spot welding to the stepped portion 3aA, whereas the end 7b of the metal tube 7 is arranged to be in a non-stationary state, that is, capable of relative movement on the movable flange 4. Due to the free movement of the end 7b even at high temperatures, the heat-resistant metal tube 7 can absorb structural changes tending to arise from heat shrinkage. Alternatively, a well-known sleeve (not shown) derived from sintered ceramic material may be used in place of the metal tube 7. It is desired that in the case on use of the heat-resistant metal tube 7, a tubular cover (not shown) be further disposed peripherally on such metal tube (namely a sleeve), which tubular cover is obtainable using a known process for spray coating of a ceramic material.

EXAMPLES

Although the present invention has been generally described, a clear understanding of the invention can be obtained by reference to certain specific examples provided below. It should be noted that these examples are considered illustrative, but not restrictive.

Example 1

Performance evaluation was made of an insulating roll viewed in FIG. 4. Testing was carried out with use of an apparatus shown in FIG. 5.

Figure 5:
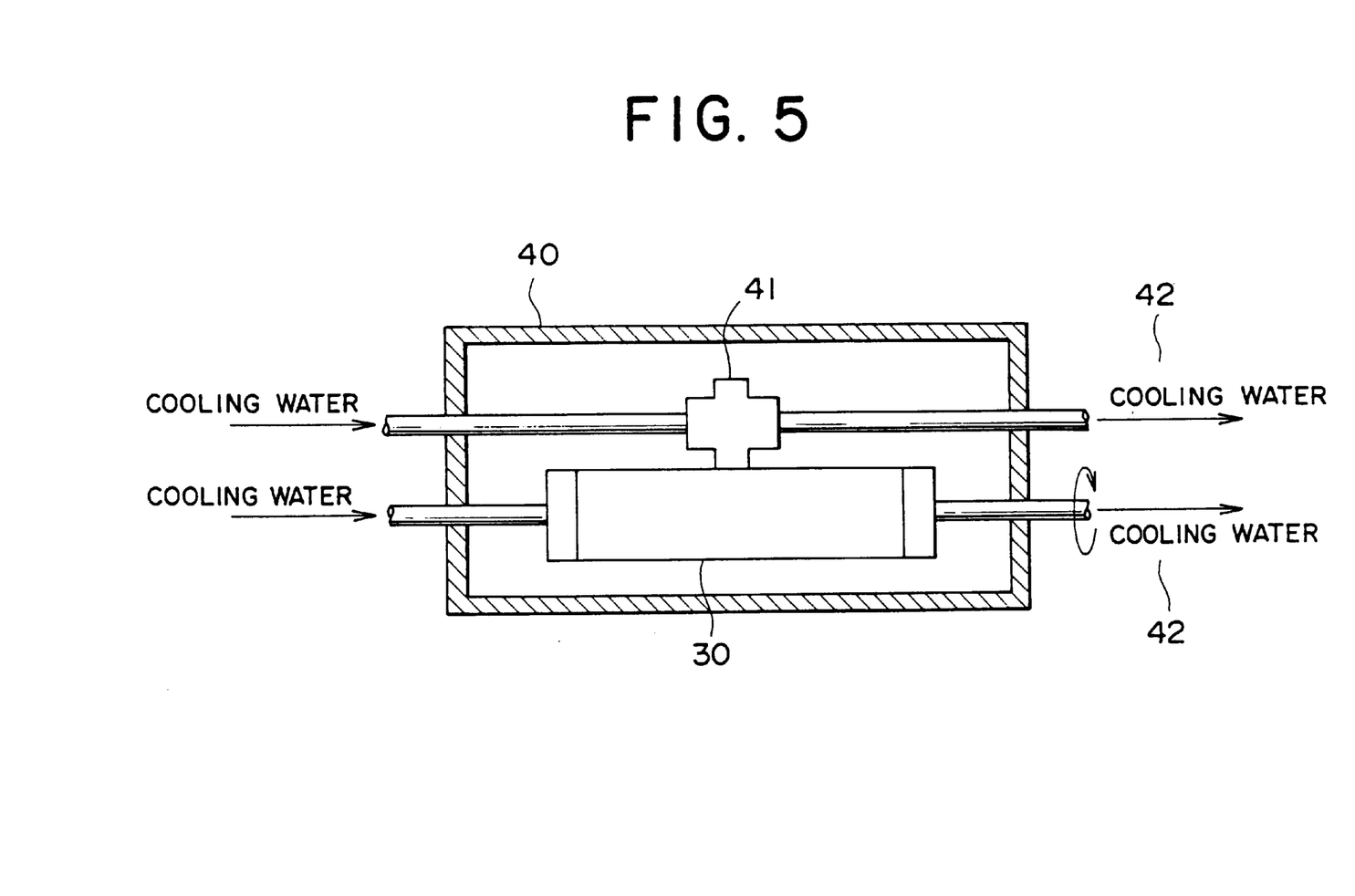
FIG. 5 is a schematic diagram explanatory of a test apparatus used for the performance evaluation of the roll shown in FIG. 4.

That is, and with reference to FIG. 5, the insulating roll 30 was positioned in a heating furnace 40, and a load roll 41 was located in cojoining relation to the roll 30. Cooling water 42 was allowed to flow through both of the rolls 30, 41, thereby putting them in cooled condition. In this test, a heat-resistant metal tube 7 was made of SUS 310S, while inorganic material-derived discs 6 were formed from ASK #2055 manufactured by Astechnika Co. To facilitate comparison, a roll was produced and tested, though not shown, wherein a support ring with a thickness of 5 mm had been mounted centrally peripherally of a roll body so as to support a heat-resistant metal tube with respect to the roll body.

Heating was effected by the heating furnace 40 of FIG. 5. Thermal insulation was adjudged by measurement of those temperatures read at an inlet and at an outlet of each of the two rolls 30, 41 at which places the cooling water 42 was introduced and discharged. Scale deposit was observed by causing the SUS 316-made load roll 41 to roll on the test roll 30. Test conditions were 1150° C. in furnace temperature, 2.5 l/min in flow rate of cooling water, 8 kgf/cm in linear pressure of load roll, 40 rpm in roll revolution and 24 hr in test time. The temperatures of the cooling water were found at 19° C. to be the inlet and 45° C. at the outlet.

Example 2

The same test conditions as in Example 1 were repeated except that a tubular cover was further disposed over the heat-resistant metal tube 7. This tubular cover was formed by spray coating of an $Al_2O_3 \cdot ZrO_2$ ceramic material in a thickness of 0.4 to 0.5 mm on to the tube 7.

Example 3

The same test conditions as in Example 1 were repeated except that a sleeve formed of an $Al_2O_3$ ceramics manufactured by Nickerto Co. was used in place of the heat-resistant metal tube. Upon attachment of this sleeve to and over the metal conduit 1, the sleeve and the fixed flange 3 were fitted to each other with an inorganic adhesive of a thermally resistant type coated on their respective contacting surfaces. This was because the fixed flange 3 was not susceptible to welding.

The beneficial effects obtained with Examples 1, 2 and 3 are tabulated in Table 1.

TABLE 1

| A Beneficial Effects of Examples 1, 2 and 3 | | | | | |
|---|---|---|---|---|---|
| | | Example 1 | Example 2 | Example 3 | Comparison |
| Temperature of | | | | | |
| cooling water | Inlet | 18 | 18 | 18 | 18 |
| ° C. | Outlet | 45 | 45 | 42 | 85 |
| Flow rate of cooling water, l/min | | 2.5 | 2.5 | 2.5 | 7.8 |
| Furnace temperature, ° C. | | 1150 | 1150 | 1150 | 860 |
| Scale deposit | | Δ | ○ | ○ | ○ |
| Remarks | | Sufficient thermal insulation attained. | ← | ← | Vapor lock avoided by increased flow rate of cooling water. |

TABLE 1-continued

A Beneficial Effects of Examples 1, 2 and 3

| | Example 1 | Example 2 | Example 3 | Comparison |
|---|---|---|---|---|
| | Slight scale deposit observed. | Good resistance to scale deposit obtained. | ← | Furnance temperature not possibly maintained at 1150° C. due to too small capacity of furnace heater. |

Example 4

A comparative test was conducted with a transport roll of a commercial size used for transporting a welded stainless steel tube to an annealing furnace.

The transport roll currently practiced in the art is dimensioned to be 139.8 mm in outside diameter of the outer tube, 9.5 mm in thickness of the outer tube and 2000 mm in face length of the roll and is formed from a SUS 310 material. Moreover, such transport roll is provided with a metal conduit 1 of a water-cooled type having an outside diameter of 60 mm, and support rings of 120.5 φ×60 φ×8 mmt positioned at a pitch of 200 mm to thereby support the outer tube.

Figure 6:
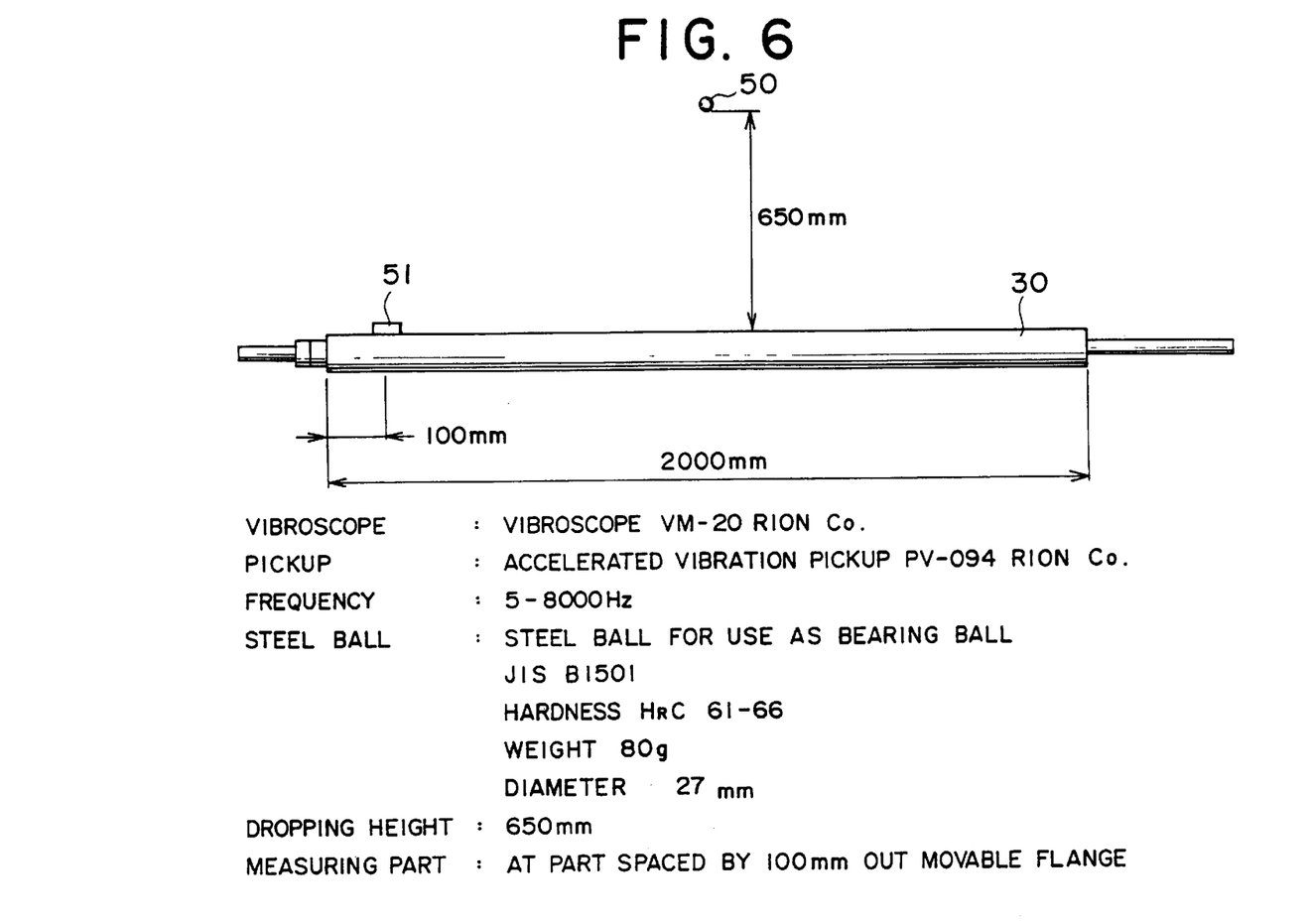
FIG. 6 is a schematic diagram explanatory of a test method used in determining the acoustic properties of the roll shown in FIG. 4.

After dismantling of those support rings from the roll, disc material which is derived from ASK #2055 which is made by Astechnika Co., Ltd. were located instead and fixed with a movable flange 4 and nuts 5. The outer tube was welded on a side where the fixed flange 3 was located, but was placed in a key-pin structure on the side where the movable flange 4 was located. This structure had a role to accommodate thermal expansion occurring axially of the outer tube, but to absorb only torsional stress of the outer tube arising from rotation of the roll. An insulating roll 30 within the scope of the present invention and a conventional insulating roll as a comparative example were further tested by a method shown in FIG. 6. A steel ball 50 was allowed to drop on each of the rolls from a height of 650 mm at which time the resulting loudness of sound was collected by means of a vibration pickup 51.

The beneficial effects obtained with Example 4 are tabulated in Table 2.

TABLE 2

Beneficial effects of Example 4

| | | Example 4 | Comparison (currently practiced) |
|---|---|---|---|
| Temperature of cooling water ° C. | Inlet | 19 | 19 |
| | Outlet | 53 | 78 |
| Flow rate of cooling water, 1/min. | | 10 | 80 |
| Surface temperature of roll, ° C. | | 1075 | 795 |
| Vibration level, dB | | 117 | 138 |

Being constructed as described and shown hereinbefore, the insulating roll of the present invention is conducive to significant advantages given below.

In this roll construction, a heat-resistant metal tube, a tubular cover obtainable by spray coating a ceramic material on such metal tube, and a sleeve derivable from sintered ceramic material, all these members being arranged to constitute external parts of the roll, are excellent in thermal wear resistance and also in thermal shock resistance. Furthermore, the heat-resistant metal tube for use as an outer tube is highly resistant to warping due to deflection in the hot state since the tightly packed inorganic material-derived discs are capable of supporting the outer tube in its entirety. The ceramics-spray coated cover or the sintered ceramics-made sleeve when used precludes surface defects such as scale deposition and the like which would take place on a material being heat treated, which defects cannot be fully prevented by use of the heat-resistant metal tube. This also avoids dents resulting from such defects and appearing on the heat-treated material, thus contributing greatly to improved yield of the treated material. In addition and advantageously, noise is abated which would otherwise be emitted upon collision of the roll with a material being transported.

What is claimed is:

1. An insulating roll comprising: a metal conduit having first and second longitudinally separated outer peripheral portions, the metal conduit being arranged to pass cooling water therethrough; a plurality of discs each derived from an inorganic material and laminated with each other, the discs being positioned axially on and around said metal conduit;

a movable flange movably positioned on said first outer peripheral portion of said metal conduit;

a fixed flange fixed to said second outer peripheral portion of said metal conduit, said fixed flange having a stepped portion facing away from said metal conduit and facing toward said movable flange, said plurality of discs being between said fixed flange and said movable flange; and a metal tube formed of a heat resistant metal, said metal tube having a first end fixed to said stepped portion of the fixed flange and a second end positioned on said movable flange such that said second end can move with respect to said movable flange.

2. An insulating roll according to claim 1, further comprising a tubular cover of a ceramic material over said metal tube.

3. An insulating roll comprising: a metal conduit having first and second longitudinally separated outer peripheral portions, the metal conduit being arranged to pass cooling water therethrough; a plurality of discs each formed of an inorganic material and laminated with each other, the discs being positioned axially on and around said metal conduit;

a movable flange movably positioned on said first outer peripheral portion of said metal conduit;

a fixed flange fixed to said second outer peripheral portion of said metal conduit, said fixed flange having a stepped portion facing away from said metal conduit and facing toward said movable flange, said plurality of discs being between said fixed flange and said movable flange; and a sleeve formed of sintered ceramic material, said sleeve having a first end fixed to said stepped portion of said fixed flange and a second end positioned on said movable flange such that said second end can move with respect to said movable flange.

4. An insulating roll according to claim 1, wherein said first and second portions are at first and second ends of said metal conduit, respectively.

5. An insulating roll according to claim 1, wherein the movable flange has a first surface facing said movable flange and a second surface facing away from said movable flange, said insulating roll further comprising a nut for bearing against said second surface of said movable flange, said metal conduit having a threaded outer peripheral portion engaged by said nut.

6. An insulating roll according to claim 2, wherein said ceramic material is formed by spray coating said ceramic material over said metal tube.

7. An insulating roll according to claim 3, wherein said first and second portions are at first and second ends of the metal tube, respectively.

8. An insulating roll according to claim 3, wherein the movable flange has a first surface facing said movable flange and a second surface facing away from said movable flange, said insulating roll further comprising a nut for bearing against the second surface of said movable flange, said metal conduit having a threaded outer peripheral portion engaged by said nut.

9. An insulating roll comprising:

a metal conduit having first and second circumferential portions, the metal conduit being arranged to pass cooling water therethrough;

a plurality of discs each derived from an inorganic material and laminated with each other, the discs being positioned axially on and around said metal conduit;

a metal tube formed of a heat-resistant metal and disposed integrally over an outer periphery of said roll body; and a tubular cover of a ceramic material over said metal tube.

10. An insulating roll according to claim 9, wherein said tubular cover is formed by spray coating said ceramic material over said metal tube.

* * * * *

UNITED STATES PATENT AND TRADEMARK OFFICE
CERTIFICATE OF CORRECTION

PATENT NO. : 6,196,957 B1
DATED : March 6, 2001
INVENTOR(S) : Hiraguri et al.

It is certified that error appears in the above-identified patent and that said Letters Patent is hereby corrected as shown below:

Title page,
Item [56], References Cited, under "U.S. PATENT DOCUMENTS", please change "Wiemer… … … 492/46" to -- Wiemer… … … 492/40 --;

Item [57], ABSTRACT,
Line 3, please change "axially of" to -- axially on --;
Line 11, please change "feduction" to -- reduction --;

Column 1,
Line 16, please change: "welded with" to -- welded to --;
Line 35, please change: "ceramics is" to -- ceramic, is --;

Column 3,
Line 7, please change "tradenamed" to -- tradename --;
Line 16, please change "metal for" to -- metal, for --;
Line 31, please change "case on" to -- case of --;

Column 4,
Line 26, please change "at 19º C." to -- to be 19º C. --;
Lines 39-40, please change "ceramics manufactured" to -- ceramic material manufactured --;
Line 50, (under table 1), please change "A Beneficial Effects" to -- Beneficial Effects --;

UNITED STATES PATENT AND TRADEMARK OFFICE
CERTIFICATE OF CORRECTION

PATENT NO. : 6,196,957 B1
DATED : March 6, 2001
INVENTOR(S) : Hiraguri et al.

It is certified that error appears in the above-identified patent and that said Letters Patent is hereby corrected as shown below:

<u>Column 5,</u>
Line 2, (under table 2), please change "A Beneficial Effects" to
-- Beneficial Effects --; and
Line 25, please change "120.5 ϕ x 60 ϕ" to -- 120.5 mm x 60 mm --.

Signed and Sealed this

Thirtieth Day of July, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,196,957 B1
DATED : March 6, 2001
INVENTOR(S) : Hiraguri et al.

It is certified that error appears in the above-identified patent and that said Letters Patent is hereby corrected as shown below:

<u>Title page,</u>
Item [56], References Cited, U.S. PATENT DOCUMENTS, please change
"Wiemer ......... 492/46" to -- Wiemer ......... 492/40 --;
Item [57], ABSTRACT,
Line 3, please change "axially of" to -- axially on --;
Line 11, please change "feduction" to -- reduction --;

<u>Column 1,</u>
Line 16, please change "welded with" to -- welded to --;
Line 35, please change "ceramic is" to -- ceramic, is --;

<u>Column 3,</u>
Line 7, please change "tradenamed" to -- tradename --;
Line 16, please change "metal for" to -- metal, for --;
Line 31, please change "case on" to -- case of --;

<u>Column 4,</u>
Line 26, please change "at 19º C." to -- to be 19º C. --;
Lines 39-40, please change "ceramics manufactured" to
-- ceramic material manufactured --;
Line 50, (under table1), please change "A Beneficial Effects" to -- Beneficial Effects --;

<u>Column 5,</u>
Line 2, (under table 2), please change "A Beneficial Effects" to
-- Beneficial Effects --; and
Line 25, please change "120.5 φ x 60 φ" to -- 120.5 mm x 60 mm --.

Signed and Sealed this

Twenty-ninth Day of October, 2002

*Attest:*

JAMES E. ROGAN
*Attesting Officer*     *Director of the United States Patent and Trademark Office*